July 25, 1967

D. PLATNICK 3,333,171

DYNAMOELECTRIC MACHINE INCLUDING A PARTICULAR POLE
FACE ARCUATE LENGTH AND SCR FED WINDINGS

Filed Nov. 17, 1964

INVENTOR.
DAVID   PLATNICK.
BY
Frederick E. McMullen

ATTORNEY.

INVENTOR.
DAVID PLATNICK.
BY Frederick E. McMullen
ATTORNEY.

United States Patent Office 3,333,171
Patented July 25, 1967

1

3,333,171
DYNAMOELECTRIC MACHINE INCLUDING A PARTICULAR POLE FACE ARCUATE LENGTH AND SCR FED WINDINGS
David Platnick, Syracuse, N.Y., assignor to Carrier Corporation, Syracuse, N.Y., a corporation of Delaware
Filed Nov. 17, 1964, Ser. No. 411,749
5 Claims. (Cl. 318—138)

This invention relates to dynamoelectric machines, and more particularly, to a motor intended for operation on direct current.

In dynamoelectric machines such as direct current motors of the type employing a static solid state switching arrangement in place of the more conventional brush and commutator system, the solid state switching devices of that arrangement, which may for example be silicon-controlled rectifiers, are rendered operative in a determined order to energize the motor windings to operate the motor. To render the solid state switching devices inoperative and deenergize the motor windings at appropriate times, a reverse potential may be applied to the conducting switching device or devices to reduce current flow therethrough. The reduction in current flow through the conducting switching device or devices renders the switching device or devices inoperative thereby deenergizing the motor winding or windings associated therewith.

In some arrangements, capacitors are employed as the source of reverse potential. To effect timely distribution of the capacitor based potential to the conducting solid state switching device or devices, additional turn-off solid state switching devices, usually equal in number to and operatively paired with each of the energizing switching devices, are employed thereby compounding both the complexity and expense of the motor control circuit.

It is a principal object of the present invention to provide a novel operating arrangement for dynamoelectric machines.

It is a further object of the present invention to provide a new and improved static switching arrangement for dynamoelectric machines employing a reduced number of switching devices.

It is an object of the present invention to provide a new and improved circuit in which a single switching device performs the dual function of controlling the energization of one winding of a dynamoelectric machine and the deenergization of another winding thereof.

It is a further object of the present invention to provide a control arrangement for a dynamoelectric machine employing solid state switching devices, each of which performs the function of energizing one machine winding while deenergizing another winding, incorporating means for limiting current flow between machine windings.

It is an additional object of the present invention to provide a unique winding configuration for dynamoelectric machines employing applicant's improved static type switching arrangement.

This invention relates to a motor comprising in combination a stator with plural energizing windings thereon; a rotor movable in response to energizing of the windings; a first switching device; a diode connecting the output electrode of the first switching device with one of the windings; means for sensing rotor position adapted at a first rotor position to render the first switching device operative to energize the one winding; and means for rendering the first switching device inoperative to deenergize the one winding including a second switching device, a second diode connecting the output electrode of the second switching device with a second winding, and a capacitor connecting the output electrode of the first switching device to the output electrode of the second

2 switching device, the rotor position sensing means upon predetermined movement of the rotor to a second rotor position rendering the second switching device operative to energize the second winding and discharge the capacitor through the first switching device to reduce current flow through the first switching device to render the first switching device inoperative.

Other objects will be apparent from the ensuing description and drawings in which:

FIGURE 1 is a schematic diagram showing one form of circuit arrangement for dynamoelectric machines according to this invention;

Figure 2:
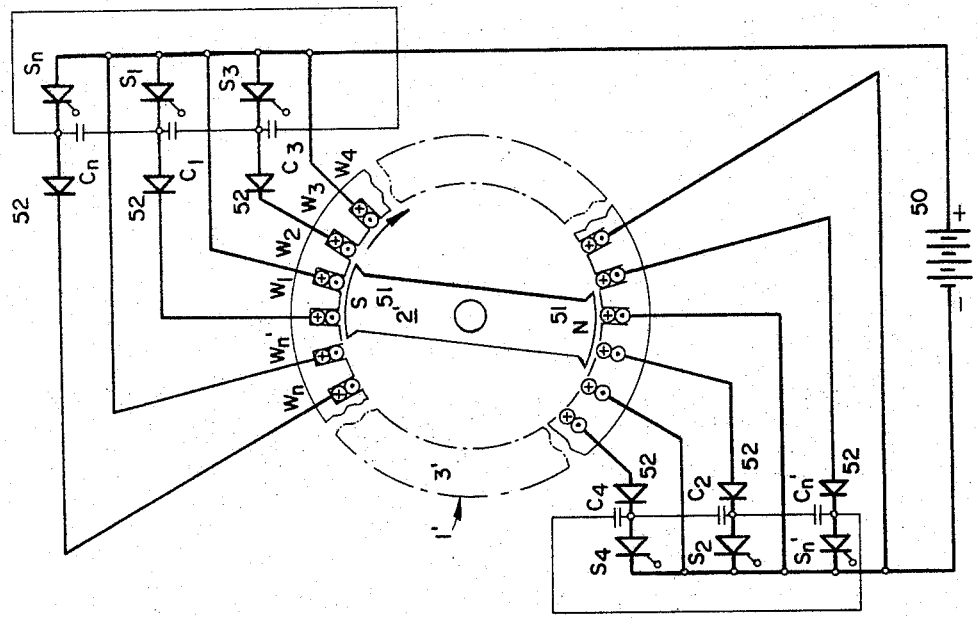
FIGURE 2 is a schematic diagram showing a second form of circuit arrangement for dynamoelectric machines according to this invention.

Referring to FIGURE 1 of the drawings, there is shown a motor 1 having a relatively rotatable rotor 2 and stator 3 inductively coupled one to the other. Preferably rotor 2 comprises a permanently magnetized member having north-south poles. Stator 3 is provided with a plurality of windings $W_1$, $W_2$, $W_3$, $W_n$ effective when energized to establish predetermined magnetic poles.

A suitable source of direct current energy, for example battery 6, is provided. Switching devices $S_1$, $S_2$, $S_3$, $S_n$ are series connected with windings $W_1$, $W_2$, $W_3$, $W_n$, respectively, across the positive and negative sides of battery 6. A diode 15 is series connected between the output electrodes of each of switching devices $S_1$, $S_2$, $S_3$, $S_n$ and windings $W_1$, $W_2$, $W_3$, $W_n$. Diodes 15 prevent the flow of current from windings $W_1$, $W_2$, $W_3$, $W_n$ to switching devices $S_1$, $S_2$, $S_3$, $S_n$ respectively. Control capacitors $C_1$, $C_2$, $C_3$, $C_n$ are connected between the output electrodes of switching devices $S_1$, $S_2$; $S_2$, $S_3$; $S_3$, $S_n$; and $S_n$, $S_1$ respectively.

Switching devices $S_1$, $S_2$, $S_3$, $S_n$ are preferably solid state or semiconductor type switching devices and preferably silicon-controlled rectifiers. Other suitable switching devices such as thyratrons may be contemplated. Switching devices $S_1$, $S_2$, $S_3$, $S_n$, when rendered operative, complete a circuit from the positive terminal of battery 6 through windings $W_1$, $W_2$, $W_3$, $W_n$, respectively, to the negative terminal of battery 6. Current flow through windings $W_1$, $W_2$, $W_3$, $W_n$ is in the direction indicated by the solid line arrow of the drawings.

Operation of switching devices $S_1$, $S_2$, $S_3$, $S_n$ is controlled in response to the position of motor rotor 2 by sensing mechanism 35. Sensing mechanism 35 includes a generally cylindrical disc-like element 36 operably connected to motor rotor 2 for rotation therewith. Disc-like element 36 is comprised of nonmagnetic material such as brass or plastic having magnet 37 secured thereto.

Sensing mechanism 35 includes a plurality of generally C-shaped core members 30 formed from a suitable ferromagnetic material and disposed radially about disc 36 in overlapping relationship with the peripheral edges thereof. Windings $L_1$, $L_2$, $L_3$, $L_n$ are disposed on core members 30. Windings $L_1$, $L_2$, $L_3$, $L_n$ are connected across the control and output electrodes of switching devices $S_1$, $S_2$, $S_3$, $S_n$ respectively.

Movement of magnet 37 through each of the C-shaped core members 30 generates a signal pulse in winding $L_1$, $L_2$, $L_3$, or $L_n$ which is applied to the control electrode of switching device $S_1$, $S_2$, $S_3$, or $S_n$ respectively to render that switching device operative. The amplitude and duration of the signal pulse generated in windings $L_1$, $L_2$, $L_3$, $L_n$ is dependent upon the speed of rotation of motor rotor 2.

Preferably, a pair of breakdown or Zener diodes 40, 41 are connected back-to-back across each of the signal windings $L_1$, $L_2$, $L_3$, $L_4$. Diodes 40, 41 limit the amplitude of the signal pulse applied to the control electrode of switching devices $S_1$, $S_2$, $S_3$, $S_n$.

With motor rotor 2 rotating in a clockwise direction as shown by the solid line arrow in FIGURE 1 of the drawings and disc-like element 36 of sensing mechanism 35 in the position shown, the signal pulse generated in winding $L_1$ on movement of magnet 37 through core member 30 thereof places a positive potential on the control electrode of switching device $S_1$ to render switching device $S_1$ operative. Switching device $S_1$ completes a circuit from battery 6 to energize winding $W_1$. Current flow through winding $W_1$ is in the direction shown by the solid line arrow. Capacitor $C_1$ is charged in the manner shown in the drawings.

As magnet 37 moves clockwise, the signal pulse generated in winding $L_2$ of sensing mechanism 35 renders switching device $S_2$ operative. Switching device $S_2$ completes a circuit from the positive terminal of battery 6 through switching device $S_2$ to the negative terminal of battery 6 to energize the winding $W_2$. Operation of switching device $S_2$ connects capacitor $C_1$ across switching device $S_1$. The discharge of capacitor $C_1$ through switching device $S_1$ reduces current flow through switching device $S_1$ to render switching device $S_1$ inoperative.

Clockwise rotation of disc-like element 36 of sensing mechanism 35 moves magnet 37 into inductive relationship with windings $L_3$, $L_n$ to sequentially generate signal pulses in the windings $L_3$, $L_n$ and render switching devices $S_3$, $S_n$ operative. The operation of switching device $S_3$ connects winding $W_3$ across battery 6 and discharges capacitor $C_2$ to deenergize switching device $S_2$. The operation of switching device $S_n$ connects winding $W_n$ across battery 6 and discharges capacitor $C_3$ to deenergize switching device $S_3$. As magnet 37 again moves into inductive relationship with winding $L_1$, switching device $S_1$ is rendered operative to energize winding $W_1$ in the manner explained heretofore. Operation of switching device $S_1$ connects capacitor $C_n$ across the switching device $S_n$ to render switching device $S_n$ inoperative.

While motor 1 of FIGURE 1 is illustrated as having four energizing windings $W_1$, $W_2$, $W_3$, $W_n$, it is understood that the number of windings W may be varied. It is further understood that each of the switching devices $S_1$, $S_2$, $S_3$, $S_n$ may control the energization of more than one winding and further that each of the windings $L_1$, $L_2$, $L_3$, $L_n$ of signal generating means 35 may regulate operation of more than one switching device.

Figure 3:
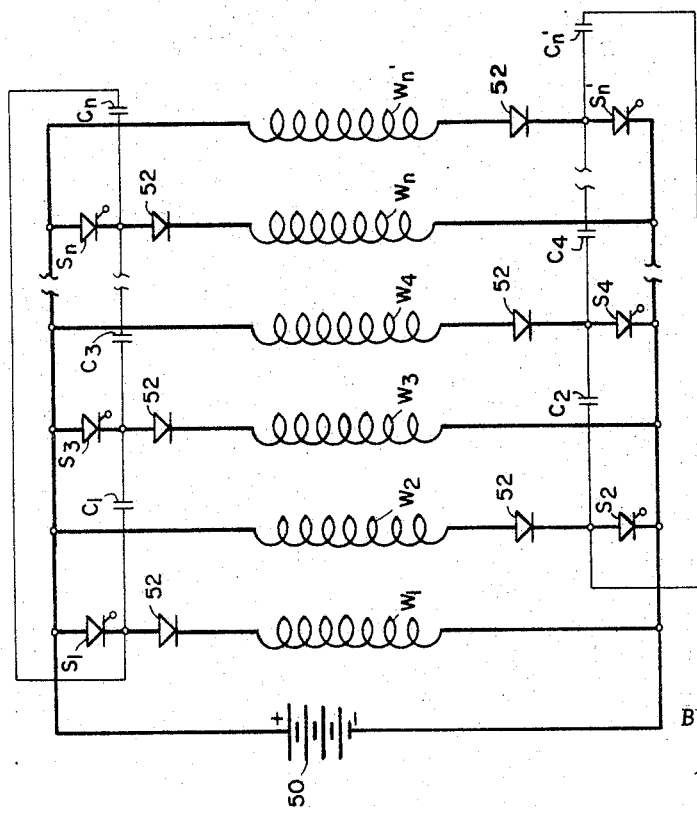
FIGURE 3 is a circuit diagram of the arrangement shown in FIGURE 2.

In the arrangement of FIGURES 2 and 3 of the drawings, a motor 1' is therein shown having a stator 3' with a plurality of independent energizing windings $W_1$, $W_2$, $W_3$, $W_4$, $W_n$, $W_n'$ arranged thereabout. As may be seen in FIGURE 2, each stator slot has two windings disposed therein and arranged so that current flow through the windings, upon energization thereof, is in opposite directions.

Rotor 2' of motor 1', preferably comprising a permanently magnetized member having north-south poles of predetermined arcuate extent, is rotatably positioned within stator 3' so as to be inductively coupled to windings $W_1$, $W_2$, $W_3$, $W_4$, $W_n$, $W_n'$. The circumferential spacing between each of windings $W_1$, $W_2$, $W_3$, $W_4$, $W_n$, $W_n'$ is less than the arcuate extent of north-south pole faces 51 of rotor 2' so that at least one of the windings $W_1$, $W_2$, $W_3$, $W_4$, $W_n$, $W_n'$ is opposite the north-south pole faces 51 at all rotational positions of rotor 2'.

It is understood that the arcuate extent of north-south pole faces 51 as well as the number of north-south poles of rotor 2' may be varied. Additionally, the number of windings $W_1$, $W_2$, $W_3$, $W_4$, $W_n$, $W_n'$ may be varied.

Each of windings $W_1$, $W_2$, $W_3$, $W_4$, $W_n$, $W_n'$ is connected to a suitable source of direct current energy such as battery 50 through switching devices $S_1$, $S_2$, $S_3$, $S_4$, $S_n$, $S_n'$, respectively. Switching devices $S_1$, $S_2$, $S_3$, $S_4$, $S_n$, $S_n'$ are preferably solid state or semiconductor type switching devices such as silicon-controlled rectifiers. Diodes 52 are connected between the output electrode of switching devices $S_1$, $S_2$, $S_3$, $S_4$, $S_n$, $S_n'$ and windings $W_1$, $W_2$, $W_3$, $W_4$, $W_n$, $W_n'$. Control capacitors $C_1$, $C_2$, $C_3$, $C_4$, $C_n$, $C_n'$ are connected across the output electrodes of switching devices $S_1$, $S_3$; $S_2$, $S_4$; $S_3$, $S_n$; $S_4$, $S_n'$; $S_n$, $S_1$; and $S_n'$, $S_2$, respectively, to form parallel capacitance control circuits.

The control electrode of switching devices $S_1$, $S_2$, $S_3$, $S_4$, $S_n$, $S_n'$ is connected to a suitable device adapted to selectively apply an actuating signal thereto to render switching devices $S_1$, $S_2$, $S_3$, $S_4$, $S_n$, $S_n'$ operative to energize windings $W_1$, $W_2$, $W_3$, $W_4$, $W_n$, $W_n'$ and operate motor 1'. The controlling device preferably comprises a magnetic position sensing mechanism of the type shown at 35 in FIGURE 1 of the drawings. It is understood that the signal generating means 35 of FIGURE 1 is suitably modified to provide additional ferromagnetic core members, each with a signal generating winding L thereon, suitably arranged about the circumference of the disc-like element 36 to control the switching devices associated with windings $W_n$, $W_n'$ of motor 1'.

On clockwise rotation of motor rotor 2' as shown by the solid line arrow of FIGURE 2 with windings $W_1$, $W_2$ energized, switching device $S_3$ is rendered operative to energize winding $W_3$. Energization of winding $W_3$ sustains clockwise rotation of rotor 2'.

Operation of switching device $S_3$ connects capacitor $C_1$ across switching device $S_1$. The discharge of capacitor $C_1$ through switching device $S_1$ reduces current flow through the switching device to render switching device $S_1$ inoperative and deenergize winding $W_1$.

Switching device $S_4$, next rendered operative, energizes winding $W_4$ and connects capacitor $C_2$ across the switching device $S_2$. The discharge of capacitor $C_2$ renders switching device $S_2$ inoperative to deenergize winding $W_2$.

As rotor 2' rotates in a clockwise direction through one revolution, switching devices $S_n$, $S_n'$, $S_1$, $S_2$ are sequentially rendered operative to energize windings $W_n$, $W_n'$, $W_1$ and $W_2$ respectively. The sequential operation of switching devices $S_n$, $S_n'$, $S_1$, $S_2$ discharges capacitors $C_3$, $C_4$, $C_n$, $C_n'$ respectively to render, in the same sequence, the switching devices $S_3$, $S_4$, $S_n$, $S_n'$ respectively inoperative and deenergize windings $W_3$, $W_4$, $W_n$, $W_n'$ respectively.

It is understood that the capacitor connections between the output electrodes of the control switching devices may be varied to obtain optimum performance for various rotor pole faces. As the arcuate extent of the rotor pole face is increased, the number of windings energized at any one time may be increased. In that event, the number of parallel control capacitor circuits is increased. For example, the control capacitors may interconnect the output electrodes of every third switching device to form three control capacitor circuits; of every fourth switching device to form four control capacitor circuits, and so forth.

Suitable starting means for selectively operating the several switching devices $S_1$, $S_2$, $S_3$, $S_n$ of the arrangement shown in FIGURE 1 and the several switching devices $S_1$, $S_2$, $S_3$, $S_4$, $S_n$, $S_n'$ of the arrangement shown in FIGURES 2 and 3 to initiate and accelerate rotation of motor rotor 2, 2' respectively may be contemplated.

While I have described a preferred embodiment of the invention, it will be understood that the invention is not limited thereto since it may be otherwise embodied within the scope of the following claims.

I claim:

1. In a motor, the combination of a rotor having a pole face of predetermined arcuate length; a stator circumscribing said rotor having a series of independent windings positioned thereon, said windings being arranged on said stator so that the circumferential distance between adjacent windings is less than the predetermined arcuate length of said rotor pole face whereby at least one of said windings is opposite said rotor pole face at all rotational positions of said rotor; a first switching device, a diode connecting the output electrode of said first switching device with one of said windings; means for sensing rotor position adapted at a first rotor position to render said first switching device operative to energize said one winding, and means for rendering said first switching device inoperative to deenergize said one winding including a second switching device, a second diode connecting the output electrode of said second switching device with a second winding, said second winding being adjacent said first winding, and a first capacitor connecting the output electrode of said first switching device to the output electrode of said second switching device, said rotor position sensing means upon movement of said rotor to a second rotor position rendering said second switching device operative to energize said second winding and discharge said first capacitor through said first switching device to reduce current through said first switching device to render said first switching device inoperative.

2. A motor according to claim 1 including a third switching device, a third diode connecting the output electrode of said third switching device with a third winding, said third winding being adjacent said second winding, and a second capacitor connecting the output electrode of said second switching device with the output electrode of said third switching device, said rotor position sensing means upon predetermined movement of said rotor from said second rotor position rendering said third switching device operative to energize said third winding and discharge said second capacitor through said second switching device to reduce current flow through second switching device to render said second switching device inoperative.

3. A motor according to claim 2 including a third capacitor connecting the output electrode of said third switching device with the output electrode of said first switching device, operation of said first switching device discharging said third capacitor through said third switching device to reduce current flow through said third switching device to render said third switching device inoperative.

4. A motor according to claim 1 including a third switching device, a third diode connecting the output electrode of said third switching device with a third winding, said third winding being adjacent said second winding, said rotor position sensing means being adapted to render said third switching device operative at a third rotor position between said first and second rotor positions, and means for rendering said third switching device inoperative including a fourth switching device, a fourth diode connecting the output electrode of said fourth switching device with a fourth winding, said fourth winding being adjacent said third winding, and a second capacitor connecting the output electrode of said third switching device with the output electrode of said fourth switching device, said rotor position sensing means upon movement of said rotor from said third rotor position to a fourth rotor position rendering said fourth switching device operative to energize said fourth winding and discharge said second capacitor through said third switching device to reduce current flow through said third switching device to render said third switching device inoperative.

5. A motor according to claim 4 including a capacitor connecting the output electrode of each of said second and fourth switching devices with the output electrode of said first and third switching devices respectively, operation of said first switching device discharging one of said capacitors through said third switching device to render said third switching device inoperative; operation of said second switching device discharging the other of said capacitors through said fourth switching device to render said fourth switching device inoperative.

References Cited
UNITED STATES PATENTS

| | | | |
|---|---|---|---|
| 3,210,631 | 10/1965 | Niccolls | 318—138 |
| 3,225,277 | 12/1965 | Foulger | 318—138 |
| 3,229,179 | 1/1966 | Hetzel | 318—138 |

ORIS L. RADER, *Primary Examiner.*

G. SIMMONS, *Assistant Examiner.*